(12) United States Patent
Honda et al.

(10) Patent No.: US 9,200,127 B2
(45) Date of Patent: Dec. 1, 2015

(54) FLUORINATED ELASTOMER COMPOSITION AND FLUORINATED FOAMED RUBBER

(71) Applicant: ASAHI GLASS COMPANY, LIMITED, Chiyoda-ku (JP)

(72) Inventors: Makoto Honda, Chiyoda-ku (JP); Hiroshi Funaki, Chiyoda-ku (JP); Yasuhiko Matsuoka, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 130 days.

(21) Appl. No.: 14/053,015

(22) Filed: Oct. 14, 2013

(65) Prior Publication Data

US 2014/0045959 A1 Feb. 13, 2014

Related U.S. Application Data

(63) Continuation of application No. PCT/JP2012/059736, filed on Apr. 9, 2012.

(30) Foreign Application Priority Data

Apr. 13, 2011 (JP) ................. 2011-089079

(51) Int. Cl.
 *C08J 9/04* (2006.01)
 *C08J 9/10* (2006.01)
 *C08J 9/00* (2006.01)
 *C08K 5/14* (2006.01)

(52) U.S. Cl.
 CPC .............. *C08J 9/107* (2013.01); *C08J 9/0023* (2013.01); *C08J 9/04* (2013.01); *C08J 9/10* (2013.01); *C08J 9/102* (2013.01); *C08J 9/104* (2013.01); *C08J 2201/026* (2013.01); *C08J 2203/04* (2013.01); *C08J 2300/26* (2013.01); *C08J 2327/12* (2013.01); *C08K 5/14* (2013.01)

(58) Field of Classification Search
 CPC .............. C08J 9/0023; C08J 9/04; C08J 9/10; C08J 9/102; C08J 9/104; C08J 9/107; C08J 2201/026; C08J 2203/04; C08J 2300/26; C08J 2327/12; C08K 5/14
 See application file for complete search history.

(56) References Cited

U.S. PATENT DOCUMENTS

| 4,737,526 A | 4/1988 | Mukaiyama et al. |
| 7,402,630 B2 * | 7/2008 | Grootaert et al. .......... 525/326.3 |
| 7,528,184 B2 | 5/2009 | Funaki et al. |
| 2009/0054593 A1 | 2/2009 | Funaki et al. |

FOREIGN PATENT DOCUMENTS

| CN | 86 1 08303 A | 6/1987 |
| CN | 101824189 A | 9/2010 |
| JP | 57-191027 | 11/1982 |
| JP | S62-112637 A | 5/1987 |
| JP | 4-323233 | 11/1992 |
| JP | 3452972 | 7/2003 |
| JP | 2004-256565 | 9/2004 |
| JP | 4003964 | 8/2007 |

OTHER PUBLICATIONS

International Search Report issued Jul. 10, 2012 in PCT/JP2012/059736 filed Apr. 9, 2012.
Fluororesin Handbook edited by Takaomi Satokawa, p. 251, Nov. 30, 1990, published by Nikkan Kogyo Shimbun Ltd.

* cited by examiner

*Primary Examiner* — Irina S Zemel
(74) *Attorney, Agent, or Firm* — Oblon, McClelland, Maier & Neustadt, L.L.P.

(57) ABSTRACT

To provide a fluorinated elastomer composition which can improve, in production of a fluorinated foamed rubber by foaming and crosslinking a fluorinated elastomer using an organic peroxide as a crosslinking agent, the foamed state and physical properties of the fluorinated foamed rubber.
A fluorinated elastomer composition which comprises 100 parts by mass of a fluorinated elastomer, from 0.1 to 20 parts by mass of a blowing agent and from 0.05 to 10 parts by mass of a crosslinking agent comprising a peroxide compound, and which contains no crosslinking aid or contains a crosslinking aid comprising a compound having at least two carbon-carbon double bond-containing groups in the same molecule, in a content of at most 0.3 part by mass, is foamed and crosslinked to produce a fluorinated foamed rubber.

15 Claims, No Drawings

FLUORINATED ELASTOMER COMPOSITION AND FLUORINATED FOAMED RUBBER

TECHNICAL FIELD

The present invention relates to a fluorinated elastomer composition to be used for production of a fluorinated foamed rubber, and a fluorinated foamed rubber using the fluorinated elastomer composition.

BACKGROUND ART

As a method of crosslinking a fluorinated elastomer to obtain a fluorinated rubber, (1) a method of heating an organic peroxide to form radicals for crosslinking, (2) a method of irradiating a fluorinated rubber with radiation to form radicals for crosslinking, and (3) a method of using a crosslinking agent such as a polyol crosslinking agent or a polyamine crosslinking agent for crosslinking, have been known. Crosslinked rubber articles produced by the methods (1) and (2) are excellent in the chemical resistance (particularly the amine resistance) as compared with a crosslinked rubber article produced by the method (3).

In the methods (1) and (2), in order to improve the crosslinking properties of the fluorinated elastomer and physical properties of the obtainable fluorinated rubber, for example, a polyfunctional compound such as triallyl isocyanurate (hereinafter sometimes referred to as TAIC) is used as a crosslinking aid.

Further, a method of crosslinking and at the same time foaming the fluorinated elastomer to produce a fluorinated foamed rubber (formed product) has been known.

For example, the following Patent Documents 1 and 2 disclose a method for producing a foamed product of a fluorinated rubber by heating a composition comprising a fluorinated rubber (fluorinated elastomer), carbon black, a crosslinking aid, an organic peroxide, an organic blowing agent and thermally expansible microcapsules as a blowing agent, to be foamed and vulcanized. Patent Document 1 relates to a method of heating the composition without pressurizing it at the time of foaming, and Patent Document 2 relates to a method of heating the composition while pressuring it at the time of foaming.

Patent Document 3 discloses a method of heating a composition comprising a fluorinated rubber (fluorinated elastomer), carbon black, an inorganic filler, an organic peroxide, a crosslinking aid, a blowing agent and zinc oxide, to a temperature of at least the decomposition temperatures of the organic peroxide and the blowing agent, to be foamed and crosslinked.

Further, Non-Patent Document 1 discloses a method of forming a foamed product of a fluorinated resin.

PRIOR ART DOCUMENTS

Patent Documents

Patent Document 1: Japanese Patent No. 4003964
Patent Document 2: Japanese Patent No. 3452972
Patent Document 3: JP-A-2004-256565

Non-Patent Documents

NON-Patent Document 1: Fluororesin Handbook edited by Takaomi Satokawa, p. 251, Nov. 30, 1990, published by Nikkan Kogyo Shimbun Ltd.

DISCLOSURE OF INVENTION

Technical Problem

As disclosed in Patent Documents 1 to 3, even when an organic peroxide is used as a crosslinking agent to foam and crosslink a fluorinated elastomer to prepare a fluorinated foamed rubber, the above crosslinking aid has been used. However, the amount of use of the crosslinking aid is at least 1 part by mass, usually at least 3 parts by mass per 100 parts by mass of the fluorinated elastomer.

However, according to the findings by the present inventors, even when an organic peroxide and the crosslinking aid are used in combination to crosslink and foam the fluorinated elastomer, no favorable foamed state will be obtained, and the fluorinated foamed rubber is poor in physical properties such as the tensile break strength in some cases.

Under these circumstances, the object of the present invention is to provide a fluorinated elastomer composition with which when a fluorinated elastomer is foamed and crosslinked by using an organic peroxide as a crosslinking agent to produce a fluorinated foamed rubber, the foamed state can be improve, and physical properties of the fluorinated foamed rubber can be improved, and to provide a fluorinated foamed rubber using the fluorinated elastomer composition.

Solution to Problem

The present inventors have surprisingly found that in production of a fluorinated foamed rubber by foaming and crosslinking a fluorinated elastomer using an organic peroxide as a crosslinking agent, the foamed state will be improved when the amount of use of the crosslinking aid is smaller, or when no crosslinking aid is used, and accomplished the present invention.

The present invention provides a fluorinated elastomer composition, a fluorinated foamed rubber and its production method, according to the following [1] to [12].

[1] A fluorinated elastomer composition to be used for production of a fluorinated foamed rubber, which comprises 100 parts by mass of a fluorinated elastomer, from 0.1 to 20 parts by mass of a blowing agent and from 0.05 to 10 parts by mass of a crosslinking agent comprising a peroxide compound, and which contains no crosslinking aid or contains the following crosslinking aid in a content of at most 0.3 part by mass:

crosslinking aid: a compound having at least two carbon-carbon double bond-containing groups in the same molecule, provided that the carbon-carbon double bond-containing groups present in the same molecule may be the same or different.

[2] The fluorinated elastomer composition according to [1], wherein the fluorinated elastomer is a fluorinated elastomer containing units based on at least one fluorinated monomer selected from the group consisting of tetrafluoroethylene, vinylidene fluoride, hexafluoropropylene, a compound represented by the following formula (1) and chlorotrifluoroethylene:

$$CF_2=CFOR_f \qquad (1)$$

wherein $R_f$ is a $C_{1-9}$ perfluoroalkyl group or a $C_{2-9}$ perfluoro(oxaalkyl) group having at least one etheric oxygen atom.

[3] The fluorinated elastomer composition according to [2], wherein the fluorinated elastomer is a fluorinated elastomer further containing units based on at least one hydrocarbon monomer selected from the group consisting of a compound represented by the following formula (2), propylene and ethylene, and/or units based on a crosslinkable group-containing monomer:

$$CH_2=CHOR \quad (2)$$

wherein R is a $C_{1-8}$ alkyl group or a $C_{2-8}$ oxaalkyl group having at least one etheric oxygen atom.

[4] The fluorinated elastomer composition according to any one of [1] to [3], wherein the fluorinated elastomer is at least one member selected from the group consisting of a tetrafluoroethylene/propylene copolymer, a vinylidene fluoride/hexafluoropropylene copolymer and a tetrafluoroethylene/vinylidene fluoride/hexafluoropropylene copolymer.

[5] The fluorinated elastomer composition according to any one of [1] to [4], wherein the crosslinking aid is triallyl cyanurate, triallyl isocyanurate or trimethallyl isocyanurate.

[6] The fluorinated elastomer composition according to any one of [1] to [5], which contains the crosslinking aid in a content less than 0.1 part by mass.

[7] The fluorinated elastomer composition according to any one of [1] to [6], wherein the blowing agent is an azo compound, a nitroso compound or a hydrazine compound.

[8] A fluorinated foamed rubber, obtained by foaming and crosslinking the fluorinated elastomer composition as defined in any one of [1] to [7].

[9] The fluorinated foamed rubber according to [8], wherein the expansion ratio represented by the following formula is at least 5 times, and the tensile break strength is at least 8 kg/cm²:

expansion ratio=[specific gravity before foaming (specific gravity of composition)]/[specific gravity after foaming (specific gravity of foamed rubber)]

[10] A method for producing a fluorinated foamed rubber, which comprises foaming and crosslinking the fluorinated elastomer composition as defined in any one of [1] to [7].

[11] The method for producing a fluorinated foamed rubber according to [10], wherein the fluorinated elastomer composition is heated to from 100 to 300° C. to be foamed and crosslinked.

[12] The method for producing a fluorinated foamed rubber according to [10] or [11], wherein the fluorinated elastomer composition is heated to from 100 to 250° C., and then heated to a temperature of from 150 to 300° C. and higher than the above heating temperature.

Advantageous Effects of Invention

By producing a fluorinated foamed rubber by foaming and crosslinking the fluorinated elastomer composition of the present invention, the foamed state of the fluorinated foamed rubber will be improved, and its physical properties will be improved.

The fluorinated foamed rubber of the present invention has a favorable foamed state, and is excellent in physical properties such as the tensile break strength.

DESCRIPTION OF EMBODIMENTS

In the present invention, one obtained by foaming and crosslinking a fluorinated elastomer composition will be referred to as a fluorinated foamed rubber. The fluorinated foamed rubber means a material and at the same time, means one having a specific shape (formed product), and particularly when the fluorinated foamed rubber being a formed product is emphasized, the fluorinated foamed rubber may sometimes be referred to as a fluorinated foamed rubber formed product.

Further, an oxaalkyl group means an alkyl group having at least one carbon atom (carbon atom other than the terminal carbon atom) of the alkyl group substituted by an oxygen atom, provided that when at least two carbon atoms are substituted by an oxygen atom, such carbon atoms are not adjacent to each other. Further, the number of carbon atoms in the oxaalkyl group means a number not including the carbon atom substituted by an oxygen atom.

Further, the unit in a polymer means a minimum structural unit formed by polymerization of a monomer having a carbon-carbon unsaturated bond. The name for the units based on a monomer is represented by the name of the monomer, with unit. The same applies to a case where the name of a monomer is an abbreviation.

<Fluorinated Elastomer Composition>

The fluorinated elastomer composition of the present invention is to be used for production of a fluorinated foamed rubber, and comprises a fluorinated elastomer, a blowing agent and a crosslinking agent comprising a peroxide compound as essential components. It contains no crosslinking aid or contains only a small amount of a specific crosslinking aid.

The fluorinated elastomer may be used in combination of one or more.

<Fluorinated Elastomer>

In the present invention, the fluorinated elastomer is preferably a fluorinated elastic copolymer having a molecular weight higher than 2,000.

The fluorinated elastomer in the present invention preferably has a glass transition point of at most 20° C., more preferably at most 10° C., particularly preferably at most 5° C.

The Mooney viscosity ($LM_{1+4}$ 100° C.) at 100° C. of the fluorinated elastomer in accordance with JIS K6300 is preferably from 1 to 200, more preferably from 5 to 190, particularly preferably from 10 to 180.

[Fluorinated Monomer]

The fluorinated elastomer contains units based on a fluorinated monomer.

The fluorinated monomer is preferably tetrafluoroethylene (hereinafter sometimes referred to as TFE), vinylidene fluoride (hereinafter sometimes referred to as VdF), hexafluoropropylene (hereinafter sometimes referred to as HFP), a compound represented by the following formula (1) or chlorotrifluoroethylene. The units based on a fluorinated monomer contained in the fluorinated elastomer are preferably units based on at least one fluorinated monomer selected from the group consisting of the above monomers, whereby the fluorinated elastomer will be excellent in the heat resistance and the chemical resistance.

$$CF_2=CFOR_f \quad (1)$$

wherein $R_f$ is a $C_{1-9}$ perfluoroalkyl group or a $C_{2-9}$ perfluoro(oxaalkyl) group having at least one oxygen atom.

$R_f$ may be linear, may have a branch or may have a cyclic structure. The number of carbon atoms in the perfluoroalkyl group is preferably from 1 to 6, more preferably from 1 to 4. Further, the number of carbon atoms in the perfluoro(oxaalkyl) group is preferably from 2 to 8, more preferably from 2 to 6.

As specific examples of the perfluoroalkyl group as $R_f$, preferred are a $CF_3$ group, a $C_2F_5$ group or a $C_3F_7$ group. A compound represented by the formula (1) wherein $R_f$ is a perfluoroalkyl group (i.e. a perfluoroalkyl vinyl ether) will hereinafter sometimes be referred to as PAVE.

The number of oxygen atoms in the perfluoro(oxaalkyl) group as $R_f$ is preferably at most 4, more preferably at most 2. As specific examples of the perfluoro(oxaalkyl) group, preferred are a $C_2F_5OC_2F_4$— group, a $C_3F_7OC_3F_6$— group and a $C_3F_7OC_3F_6OC_3F_6$— group.

As specific examples of the compound represented by the formula (1), $CF_2\!=\!CFOCF_3$, $CF_2\!=\!CFOCF_2CF_3$, $CF_2\!=\!CFOCF_2CF_2CF_3$, $CF_2\!=\!CFO(CF_2)_3CF_3$, $CF_2\!=\!CFO(CF_2)_4CF_3$, $CF_2\!=\!CFOCF_2OCF_3$, $CF_2\!=\!CFOCF_2CF_2OCF_3$, $CF_2\!=\!CFOCF_2CF_2OCF_2CF_3$, $CF_2\!=\!CFO(CF_2)_3OCF_2CF_3$, $CF_2\!=\!CFOCF_2CF(CF_3)OCF_3$, $CF_2\!=\!CFOCF_2CF(CF_3)O(CF_2)_2CF_3$, $CF_2\!=\!CFO(CF_2CF_2O)_2CF_2CF_3$, $CF_2\!=\!CFO[CF_2CF(CF_3)O]_2CF_3$ and $CF_2\!=\!CFO[CF_2CF(CF_3)O]_2(CF_2)_2CF_3$ may be mentioned.

[Hydrocarbon Monomer]

The fluorinated elastomer preferably further contains units based on a hydrocarbon monomer in addition to the units based on the fluorinated monomer. The hydrocarbon monomer is a hydrocarbon compound having a carbon-carbon unsaturated bond containing no fluorine atom.

The hydrocarbon monomer is preferably a compound represented by the following formula (2), propylene (hereinafter sometimes referred to as P) or ethylene (hereinafter sometimes referred to as E), more preferably propylene. The fluorinated elastomer may contain two or more types of units based on such hydrocarbon monomers.

$$CH_2\!=\!CHOR \qquad (2)$$

wherein R is a $C_{1-8}$ alkyl group or a $C_{2-8}$ oxaalkyl group having at least one oxygen atom. R may be linear, may have a branch or may have a cyclic structure. The number of carbon atoms in the alkyl group is preferably from 1 to 6, more preferably from 1 to 4. The number of carbon atoms in the oxaalkyl group is preferably from 2 to 6, more preferably from 2 to 4. The number of oxygen atoms in the oxaalkyl group is preferably 1 or 2, more preferably 1.

As specific examples of the vinyl ether represented by the formula (2), methyl vinyl ether (hereinafter sometimes referred to as MVE), ethyl vinyl ether (hereinafter sometimes referred to as EVE), butyl vinyl ether (hereinafter sometimes referred to as BVE), methoxyethyl vinyl ether and ethoxyethyl vinyl ether may be mentioned.

In a case where the fluorinated elastomer contains units based on the hydrocarbon monomer, the proportion of the units based on the hydrocarbon monomer is preferably from 10 to 90 mol %, more preferably from 20 to 80 mol %, particularly preferably from 30 to 70 mol % per 100 mol of the units based on the fluorinated monomer and the units based on the hydrocarbon monomer in total. If the proportion is less than the lower limit of the above range, the hardness of the fluorinated foamed rubber tends to be too high, and if it exceeds the upper limit, the heat resistance and the chemical resistance are likely to be lowered. Within the above range, a fluorinated foamed rubber having rubber physical properties, heat resistance and chemical resistance in a well balanced manner will be obtained.

[Crosslinkable Group-Containing Monomer]

The fluorinated elastomer in the present invention may contain units based on a crosslinkable group-containing monomer in addition to the units based on the above monomers. In this specification, a crosslinkable group-containing monomer means a compound having at least one crosslinkable group as described hereinafter in the same molecule, having a molecular weight of at most 2,000. The crosslinkable group in the crosslinkable group-containing monomer is not substantially reacted at the time of production of the fluorinated elastomer, and the fluorinated elastomer has crosslinkable groups derived from the crosslinkable group-containing monomer.

The proportion of the units based on the crosslinkable group-containing monomer is preferably from 0.001 to 10 mol %, more preferably from 0.001 to 5 mol %, particularly preferably from 0.01 to 3 mol % in all the units (100 mol %) constituting the fluorinated elastomer. If the proportion is less than the lower limit of the above range, the crosslink density is insufficient, and no rubber physical properties are obtained in some cases. If it exceeds the upper limit, the crosslink density tends to be too high, and the heat resistance and the chemical resistance among the rubber physical properties are likely to be lowered. Within the above range, a fluorinated foamed rubber having hardness, heat resistance, chemical resistance, etc. in a well balanced manner is likely to be obtained.

The crosslinkable group in the crosslinkable group-containing monomer may, for example, be a carbon-carbon double bond-containing group, a halogen atom, an acid anhydride residue, a carboxy group, an amino group, a cyano group or a hydroxy group.

As preferred specific examples of the crosslinkable group-containing monomer, (2-bromo-1,1,2,2-tetrafluoroethyl)trifluorovinyl ether, (2-iode-1,1,2,2-tetrafluoroethyl)trifluorovinyl ether, vinyl crotonate, vinyl methacrylate, maleic anhydride, itaconic anhydride, maleic acid, itaconic acid and heptafluoro-4-pentenenitrile may be mentioned. Two or more types of the crosslinkable group-containing monomers may be used.

[Preferred Embodiment of Fluorinated Elastomer]

As a preferred embodiment of the fluorinated elastomer, for example, a TFE/P copolymer, a TFE/PNdF copolymer, a VdF/HFP copolymer, a TFENdF/HFP copolymer, a TFE/$CF_2\!=\!CFOCF_3$ copolymer, a TFE/$CF_2\!=\!CFOC_3F_7$ copolymer, a TFE/$CF_2\!=\!CFOCF_3$/$CF_2\!=\!CFOC_3F_7$ copolymer, a TFE/MVE copolymer, a TFE/EVE copolymer, a TFE/BVE copolymer, a TFE/EVE/BVE copolymer, a VdF/$CF_2\!=\!CFOC_3F_7$ copolymer or a E/HFP copolymer may be mentioned. Further, such a copolymer which further contains units based on a crosslinkable group-containing monomer is also preferred.

Among them, preferred is a TFE/P copolymer, a TFE/PNdF copolymer, a TFE/PAVE copolymer, a VdF/HFP copolymer or a TFE/VdF/HFP copolymer. Further, such a copolymer which further contains units based on a crosslinkable group-containing monomer is also preferred.

Particularly, a TFE/P copolymer, a TFE/PNdF copolymer, a VdF/HFP copolymer or a TFE/VdF/HFP copolymer is most preferred in view of the balance of the rubber physical properties, the heat resistance and the chemical resistance.

The molar ratio of the units based on the respective monomers in the above copolymer is not particularly limited and may properly be selected depending upon properties required.

For example, the molar ratio of the TFE units/P units in the TFE/P copolymer is preferably from 40/60 to 70/30, more preferably from 50/50 to 60/40.

As preferred specific examples of the fluorinated elastomer, the following copolymers may be mentioned.

A TFE (40 to 60 mol %)/P (60 to 40 mol %) copolymer, a TFE (20 to 79 mol %)/P (79 to 20 mol %)/VdF (1 to 50 mol %) copolymer, a TFE (20 to 80 mol %)/HFP (80 to 20 mol %) copolymer, a VdF (50 to 95 mol %)/HFP (5 to 50 mol %) copolymer, a TFE (1 to 35 mol %)/VdF (45 to 90 mol %)/HFP (5 to 50 mol %) copolymer, a TFE (40 to 70 mol %)/CF$_2$=CFOCF$_3$ (60 to 30 mol %) copolymer, a TFE (40 to 70 mol %)/CF$_2$=CFOC$_3$F$_7$ (60 to 30 mol %) copolymer, a TFE (40 to 70 mol %)/CF$_2$=C(OC$_2$F$_5$)$_2$ (60 to 30 mol %) copolymer, a TFE (70 to 30 mol %)/MVE (30 to 70 mol %) copolymer, a TFE (70 to 30 mol %)/EVE (30 to 70 mol %) copolymer, a TFE (70 to 30 mol %)/BVE (30 to 70 mol %) copolymer, a TFE (60 to 30 mol %)/EVE (1 to 69 mol %)/BVE (1 to 69 mol %) copolymer, a VdF (40 to 70 mol %)/CF$_2$=CFOC$_3$F$_7$ (60 to 30 mol %) copolymer and an E (40 to 60 mol %)/HFP (60 to 40 mol %) copolymer. Further, such a copolymer which further contains units based on a crosslinkable group-containing monomer in an amount of from 0.001 to 10 mol % based on all the units is also preferred.

Here, a TFE (40 to 60 mol %)/P (60 to 40 mol %) copolymer means a copolymer containing TFE units and P units in a ratio of 40 to 60 mol %:60 to 40 mol %, and the same applies to the other copolymers.

Further, a TFE (40 to 60 mol %)/P (60 to 40 mol %) copolymer which further contains units based on a crosslinkable group-containing monomer in an amount of from 0.001 to 10 mol % based on all the units means a copolymer containing TFE units and P units in a ratio of 40 to 60 mol %:60 to 40 mol %, and which further contains units based on a crosslinkable group-containing monomer in an amount of from 0.001 to 10 mol % based on all the units, and the same applies to the other copolymers.

[Method for Producing Fluorinated Elastomer]

The method for producing a fluorinated elastomer is not particularly limited, and e.g. emulsion polymerization or solution polymerization may preferably be employed, and emulsion polymerization is particularly preferred. As an emulsifying agent to be used for the emulsion polymerization, a known hydrocarbon emulsifying agent such as sodium lauryl sulfate or sodium dodecylbenzene sulfonate, or a fluorinated emulsifying agent such as ammonium perfluorooctanoate, ammonium perfluorohexanoate, C$_2$F$_5$—O—C$_2$F$_4$—O—CF$_2$—COONH$_4$ or C$_3$F$_7$—O—CF(CF$_3$)—CF$_2$—O—CF(CF$_3$)—COONH$_4$ may be used.

<Blowing Agent>

The blowing agent is not particularly limited, and is preferably an organic decomposable chemical blowing agent, more preferably an azo compound, a nitroso compound or hydrazine compound. As specific examples of the organic decomposable chemical blowing agent, azodicarbonamide, barium azodicarboxylate, N,N-din itrosopentamethylenetetramine, benzenesulfonylhydrazine or hydrazodicarbonamide may be mentioned. As the blowing agent, two or more of the above compounds may be used.

The content of the blowing agent in the fluorinated elastomer composition is from 0.1 to 20 parts by mass, preferably from 0.3 to 15 parts by mass, more preferably from 0.5 to 10 parts by mass per 100 parts by mass of the fluorinated elastomer. Within such a range, a composition which provides a fluorinated foamed rubber (a fluorinated foamed rubber formed product) excellent in the uniformity of the foamed portion, the surface smoothness of the formed product, the heat resistance and the rubber physical properties is likely to be obtained.

<Crosslinking Agent>

The fluorinated elastomer composition contains a crosslinking agent comprising an organic peroxide as an essential component. The organic peroxide is not particularly limited, and is preferably an organic peroxide having a one-minute half-life temperature of from 150 to 250° C., more preferably from 150 to 200° C., which is a temperature at which half an amount of the organic peroxide is decomposed in one minute.

As specific examples of the organic peroxide, dialkyl peroxides such as di-tert-butylperoxide, tert-butylcumylperoxide, dicumylperoxide, α,α-bis(tert-butylperoxy)-p-diisopropylbenzene, 2,5-dimethyl-2,5-di(tert-butylperoxy)hexane, 2,5-dimethyl-2,5-di(tert-butylperoxy)hexane-3 and 1,3-bis(tert-butylperoxyisopropyl)benzene, 1,1-di(tert-butylperoxy)-3,3,5-trimethylcyclohexane, 2,5-dimethylhexane-2,5-dihydroxyperoxide, benzoylperoxide, tert-butylperoxybenzene, 2,5-dimethyl-2,5-di(benzoylperoxy)hexane, tert-butylperoxy maleic acid and tert-butylperoxyisopropylcarbonate. Two or more types of such organic peroxides may be used.

The content of the organic peroxide in the fluorinated elastomer composition is from 0.05 to 10 parts by mass, preferably from 0.3 to 5 parts by mass, more preferably from 0.5 to 3 parts by mass per 100 parts by mass of the fluorinated elastomer. Within such a range, a composition which provides a fluorinated foamed rubber (fluorinated foamed rubber formed product) excellent in the uniformity of the foamed portion, the surface smoothness of the formed product, the heat resistance and the rubber physical properties is likely to be obtained.

<Crosslinking Aid>

The crosslinking aid in the fluorinated elastomer composition is a compound having at least two reactive functional groups in the same molecule. The reactive functional group may be a carbon-carbon double bond-containing group, a halogen atom, an acid anhydride residue, a carboxy group, an amino group, a cyano group or a hydroxy group. The plurality of the reactive functional groups present in the same molecule of the crosslinking aid may be the same or different.

The carbon-carbon double bond-containing group may, for example, be an alkenyl group such as a vinyl group, an allyl group or a methallyl group, an unsaturated acyl group such as an acryloyl group or a methacryloyl group, or a maleimide group. The carbon-carbon double bond-containing group is preferably a C$_{2-4}$ alkenyl group, particularly preferably an allyl group.

The crosslinking aid may, for example, be triallyl cyanurate, triallyl isocyanurate, trimethallyl isocyanurate, 1,3,5-triacryloylhexahydro-1,3,5-triazine, triallyl trimellitate, m-phenylenediamine bismaleimide, p-quinonedioxime, p,p'-dibenzoylquinone dioxime, dipropargyl terephthalate, diallyl phthalate, N,N',N",N"'-tetraallylterephthalamide or a vinyl group-containing siloxane oligomer such as polymethylvinylsiloxane or polymethylphenylvinylsiloxane.

In the fluorinated elastomer composition of the present invention, the crosslinking aid may be contained or may not be contained. In a case where the fluorinated elastomer composition of the present invention contains the crosslinking aid, as the crosslinking aid, a compound having at least two carbon-carbon double bond-containing groups in the same molecule is used, provided that in the compound having at least two carbon-carbon double bond-containing groups in the same molecule, the carbon-carbon double bond-containing groups present in the same molecule may be the same or different.

In a case where the fluorinated elastomer composition of the present invention contains a crosslinking aid, the crosslinking aid is preferably at least one member selected from the group consisting of triallyl cyanurate, triallyl isocyanurate and trimethallyl isocyanurate. Particularly in view of the crosslinking reactivity, the crosslinking aid is more preferably triallyl isocyanurate (TAIC), and it is particularly preferred to use only TAIC as the crosslinking aid.

In a case where the crosslinking aid is contained, the content of the crosslinking aid is at most 0.3 part by mass, preferably less than 0.1 part by mass per 100 parts by mass of the fluorinated elastomer composition. When the content of the crosslinking aid is at most 0.3 part by mass, the fluorinated foamed rubber obtainable by foaming and crosslinking the fluorinated elastomer composition will be excellent in the uniformity of the foamed portion and is excellent in the surface smoothness. Further, the fluorinated foamed rubber will be excellent in physical properties such as the tensile break strength, and is excellent in the heat resistance and the chemical resistance. The lower limit of the content of the crosslinking aid is preferably at least 0.001 part by mass, more preferably at least 0.005 part by mass, most preferably at least 0.01 part by mass per 100 parts by mass of the fluorinated elastomer composition. Within such a range, by containing the crosslinking aid, the fluorinated foamed rubber will be excellent in physical properties and is further excellent in the heat resistance and the chemical resistance.

The fluorinated elastomer composition of the present invention most preferably contains no crosslinking aid.

<Additives>

In the fluorinated elastomer composition, as the case requires, additives such as a pigment, a filler, a reinforcing agent, a processing aid and an acid acceptor may be contained. Further, other known additives may be contained.

As specific examples of the pigment, non-substituted quinacridone, dimethyl quinacridone, anthraquinonyl red, polyazo yellow, benzimidazolone yellow, cupper phthalocyanine blue, copper phthalocyanine green and cobalt phthalocyanine blue may be mentioned.

The content of the pigment is preferably from 0.1 to 50 parts by mass 100 pars by mass of fluorinated elastomer.

As specific examples of the filler, clay and talc may be mentioned. The content of the filler is preferably from 1 to 100 parts by mass per 100 parts by mass of the fluorinated elastomer.

As specific examples of the reinforcing agent, carbon black, titanium oxide, silicon dioxide and fluorinated resins such as polytetrafluoroethylene, polyvinylidene fluoride, polyvinyl chloride, polychlorotrifluoroethylene, a TFE/ethylene copolymer, a TFE/hexafluoropropylene copolymer and a TFE/perfluoro(alkyl vinyl ether) copolymer may be mentioned. The melting temperature of the fluorinated resin as the reinforcing agent is preferably higher than 20° C. The content of the reinforcing agent is preferably from 1 to 100 parts by mass per 100 pars by mass of the fluorinated elastomer.

The processing aid is preferably stearic acid and its salt. As specific example of the stearate, sodium stearate, potassium stearate, calcium stearate and magnesium stearate may be mentioned. Two or more types of stearic acid and its salt may be used.

The content of the processing aid is preferably from 0.01 to 10 parts by mass, more preferably from 0.1 to 3 parts by mass per 100 parts by mass of the fluorinated elastomer.

The acid acceptor may be a metal oxide or a metal carbonate. As specific examples of the metal oxide, ZnO, MgO, CaO, $TiO_2$, CuO and BaO may be mentioned. As specific examples of the metal carbonate, $ZnCO_3$, $MgCO_3$ and $CaCO_3$ may be mentioned. The content of the acid acceptor is preferably from 0 to 5 parts by mass per 100 parts by mass of the fluorinated elastomer.

<Method for Producing Fluorinated Elastomer Composition>

The fluorinated elastomer composition of the present invention is obtained by mixing the above respective components. As a mixing method, various mixing methods may be applicable, and preferred is a kneading method using a two roll, a kneader or a Banbury mixer. In a case where heat generation is significant at the time of kneading, it is preferred to cool a kneading machine such as a roll. The kneading temperature is preferably at most 100° C., more preferably at most 80° C. If the kneading temperature exceeds 100° C., the blowing reaction and/or the crosslinking reaction may occur. The lower limit of the kneading temperature is not particularly limited and is usually 20° C.

<Method for Producing Fluorinated Foamed Rubber (Formed Product)>

The fluorinated foamed rubber of the present invention is obtained by foaming and crosslinking the fluorinated elastomer composition of the present invention.

Specifically, when the fluorinated elastomer composition is heated to a temperature of at least the decomposition temperature of the blowing agent, the foaming reaction occurs, and when it is heated to a temperature of at least the decomposition temperature of the crosslinking agent, the crosslinking reaction occurs. In the present invention, it is preferred to heat the fluorinated elastomer composition to a temperature of at least the decomposition temperature of the blowing agent and to a temperature of at least the decomposition temperature of the crosslinking agent, so as to conduct the foaming reaction and the crosslinking reaction simultaneously. The heating may be conducted under elevate pressure or under normal pressure.

Forming is carried out simultaneously with foaming so that a predetermined shape is achieved after completion of the foaming reaction, thereby to obtain a fluorinated foamed rubber formed product. The forming method is not particularly limited, and may, for example, be pressure forming, compression forming, extrusion or injection molding. The crosslinking reaction may be conducted simultaneously with forming, or it may be conducted after forming, or they may be combined.

Further, it is also possible to form the foamed and crosslinked fluorinated foamed rubber formed product (for example, a sheet-shape formed product) e.g. by cutting it into a predetermined shape, however, a higher yield will be obtained when the composition is formed into a predetermined shape simultaneously with foaming.

The heating temperature of the fluorinated elastomer composition at the time of producing a fluorinated foamed rubber is preferably within a range of from 100 to 300° C. By heating within such a temperature range, the blowing reaction and the crosslinking reaction will proceed in a well balanced manner, whereby a fluorinated foamed rubber excellent in the uniformity of the foamed state will be obtained. In a case where the composition is formed under elevated pressure, the fluorinated foamed rubber formed product excellent in the surface smoothness will be obtained. Further, a fluorinated foamed rubber excellent in physical properties such as the tensile break strength and excellent in the heat resistance and the chemical resistance will be obtained.

Further, by the combination of primary heating at a relatively low temperature and secondary heating at a relatively high temperature, a more favorable foamed state is likely to be obtained. The primary heating temperature is preferably from 100 to 250° C. The secondary heating temperature is higher than the primary heating temperature, and the secondary heating temperature is preferably from 150 to 300° C., more preferably from 150 to 250° C., most preferably from 170 to 250° C. The secondary heating temperature is preferably higher than the primary heating temperature by at least 10° C., more preferably by at least 20° C. Further, the secondary heating may be carried out by stepwise increasing the temperature. The heating time is properly selected.

As a specific example of the combination of the primary heating and the secondary heating, preferred is a method in which primary heating is carried out by hot press at from 150 to 200° C. for from 3 to 60 minutes to carry out foaming, crosslinking and forming, and then the obtained formed product is heated in an oven at a temperature of from 170 to 250° C. and higher than the hot press temperature for from 1 to 24 hours so that the crosslinking reaction further proceeds.

The expansion ratio of the fluorinated foamed rubber is not particularly limited. The expansion ratio can be adjusted by the amount of use of the blowing agent or the forming conditions such as the forming temperature and the forming time.

Particularly with the fluorinated elastomer composition of the present invention, a uniform and favorable foamed state can be achieved not only in the case of a low expansion ratio but also in the case of a high expansion ratio of at least 5 times, and a fluorinated foamed rubber having favorable physical properties is obtained.

For example, even when the expansion ratio represented by the following formula is at least 5 times, a fluorinated foamed rubber excellent in the physical properties having a tensile break strength of at least 8 kg/cm$^2$, can be obtained.

Expansion ratio=[specific gravity before foaming (specific gravity of composition)]/[specific gravity after foaming (specific gravity of foamed rubber)]

The tensile break strength in this specification is a value obtained by the measurement method as specified in JIS K6251.

According to the present invention, by the fluorinated elastomer composition containing no crosslinking aid or even if it contains, containing a small amount of a specific crosslinking agent, a fluorinated foamed rubber in a uniform and favorable foamed state can stably be obtained. Accordingly, it is possible to produce a fluorinated foamed rubber having a favorable foamed state, having excellent physical properties such as the tensile break strength, rich in elasticity and excellent in the heat resistance and the chemical resistance with good reproducibility.

The reason why such effects are obtained is not clearly understood but is estimated as follows. Usually, in a case of crosslinking without foaming, the crosslink density is improved by blending a relatively large amount of a crosslinking aid, to obtain a rubber having favorable physical properties. On the other hand, in a case where foaming and crosslinking are carried out simultaneously, if a crosslinking aid is used to increase the crosslink density, foaming is suppressed and unstable. Accordingly, by using a composition containing no crosslinking aid or containing a small amount, an increases in the crosslink density of a fluorinated rubber at the time of crosslinking can be suppressed, whereby the foamed state will be favorable.

EXAMPLES

Now, the present invention will be described in further detail with reference to Examples. However, it should be understood that the present invention is by no means restricted to such specific Examples. As the measurement method and the evaluation method, the following methods were employed.

[Evaluation of Outer Appearance]

The surface state of a formed product was visually observed. A formed product on which void due to cavities by blowing opening on the surface was observed was rated as "void observed (poor)", a formed product on which no void was observed but the degree of foaming of which was non uniform was rated as "slightly poor", and the formed product of which the foamed state was uniform was rated as "good".

[Measurement of Expansion Ratio]

The specific gravity of a composition used for foaming (specific gravity before foaming) and the specific gravity after foaming (specific gravity of formed product) were measured to determine the expansion ratio (specific gravity before forming/specific gravity after foaming).

[Measurement of Physical Properties]

Using a sample punched out from the fluorinated foamed rubber formed product in a sheet-form having a thickness of 2 mm by a No. 3 dumbbell, the tensile break strength, the stretch at break and the tear strength were measured in accordance with JIS K6251. Further, the hardness (type-C) was measured in accordance with JIS K7312.

The respective components as identified in Tables are as follows.

TFE/P copolymer: a fluorinated elastomer (molar ratio of TFE units/P units=55/45) obtainable by polymerizing TFE and propylene by emulsion polymerization by a conventional method, followed by heat treatment, having a Mooney viscosity of 60.

TFENdF/HFP copolymer: a fluorinated elastomer obtained by polymerizing TFE, VdF and HFP by emulsion polymerization by a conventional method, having a Mooney viscosity of 65. Tecnoflon P959, tradename, manufactured by Solvay Solexis.

Reinforcing agent: carbon black, MT-Carbon United N990, tradename, manufactured by Ashland Inc.

Crosslinking aid: triallyl isocyanurate (TAIC).

Crosslinking agent: A mixture of 40 mass % of 1,3-bis(tert-butylperoxyisopropyl)benzene and 60 mass % of calcium carbonate, Perkadox 14, tradename, manufactured by Kayaku Akzo Corporation.

Blowing agent: Diazocarbonamide, VP#600, tradename, manufactured by Laboratory ITII Ltd. A composition comprising 50 parts by mass of azodicarbonamide, 40 parts by mass of composite zinc white (manufactured by KOMESHO SEKKAI KOGYO CO., LTD., composition of ZnO and CaCO$_3$), 10 parts by mass of uric acid and 5 parts by mass of naphthenic acid (NP-24, tradename, manufactured by Idemitsu Kosan Co., Ltd.) (105 parts by mass in total).

Processing aid: Sodium stearate.

Example 1

As a fluorinated elastomer, TFE/P copolymer was used. In a blend ratio as identified in Table 1, all the components were kneaded by a twin roll to obtain a fluorinated elastomer composition of 113.5 parts by mass in total. No crosslinking aid was blended. This fluorinated elastomer composition was primarily crosslinked by hot press at 170° C. for 20 minutes, and then secondarily crosslinked at 200° C. for 4 hours to obtain a fluorinated foamed rubber sheet having a thickness of 2 mm.

Of the fluorinated foamed rubber sheet, evaluation of outer appearance, measurement of the expansion ratio and measurement of physical properties were conducted. The results are shown in Table 1 (the same applies hereinafter).

Example 2

A fluorinated foamed rubber sheet was obtained in the same manner as in Example 1 except that 0.3 part by mass of triallyl isocyanurate as a crosslinking aid was added so that the total amount was 113.8 parts by mass. Evaluation and measurement were carried out in the same manner as in Example 1.

Example 3

A fluorinated foamed rubber sheet was obtained in the same manner as in Example 1 except that the TFE/P copolymer was changed to TFENdF/HFP copolymer. Evaluation and measurement were conducted in the same manner as in Example 1.

Comparative Example 1

A fluorinated foamed rubber sheet was obtained in the same manner as in Example 1 except that 0.5 part by mass of triallyl isocyanurate as a crosslinking aid was added so that the total amount was 114.0 parts by mass. Evaluation and measurement were conducted in the same manner as in Example 1. The foamed state of the rubber sheet was non uniform, and no accurate measurement could be conducted.

Comparative Examples 2 to 4

A fluorinated foamed rubber sheet was obtained in the same manner as in Example 1 except that the amount of addition of triallyl isocyanurate as a crosslinking aid was changed to 1.0 part by mass, 2.0 parts by mass or 3.0 parts by mass as identified in Table 1. Evaluation and measurement were conducted in the same manner as in Example 1. Void occurred on the rubber sheets, and no accurate measurement could be conducted.

Comparative Example 5

A fluorinated foamed rubber sheet was obtained in the same manner as in Example 1 except that the fluorinated elastomer was changed to TFENdF/HFP (Mooney viscosity: 65), and 1.0 part by mass of triallyl isocyanurate as a crosslinking aid was added. Evaluation and measurement were conducted in the same manner as in Example 1. Void occurred on the rubber sheets, and no accurate measurement could be conducted.

INDUSTRIAL APPLICABILITY

The foamed fluorinated rubber formed product of the present invention is useful as a packing or a vibration insulator for vehicles such as automobiles and electric cars, a vibration damper, a vibration insulator or a sound absorbing material. Further, it is also useful as a covering material for electric wires. It is also useful as a packing, a gasket, a vibration insulator, a vibration damper, a sound absorbing material or a sound insulating material for various applications such as electronic components, office automation equipment, chemical industry and building materials.

This application is a continuation of PCT Application No. PCT/JP2012/059736, filed on Apr. 9, 2012, which is based upon and claims the benefit of priority from Japanese Patent Application No. 2011-089079 filed on Apr. 13, 2011. The contents of those applications are incorporated herein by reference in its entirety.

What is claimed is:

1. A fluorinated elastomer composition to be used for production of a fluorinated foamed rubber, comprising:
   100 parts by mass of a fluorinated elastomer;
   from 0.1 to 20 parts by mass of a blowing agent;
   from 0.05 to 10 parts by mass of a crosslinking agent comprising a peroxide compound; and

TABLE 1

| | | | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|---|
| Blend ratio (parts by mass) | Fluorinated elastomer | TFE/P copolymer | 100 | 100 | 0 | 100 | 100 | 100 | 100 | 0 |
| | | TFE/VdF/HFP copolymer | 0 | 0 | 100 | 0 | 0 | 0 | 0 | 100 |
| | Reinforcing agent | Carbon black | 5 | 5 | 5 | 5 | 5 | 5 | 5 | 5 |
| | Crosslinking aid | TAIC | 0 | 0.3 | 0 | 0.5 | 1 | 2 | 3 | 1 |
| | Crosslinking agent | Perkadox 14 | 2.5 | 2.5 | 2.5 | 2.5 | 2.5 | 2.5 | 2.5 | 2.5 |
| | Blowing agent | VP#600 | 5 | 5 | 5 | 5 | 5 | 5 | 5 | 5 |
| | Processing aid | Sodium stearate | 1 | 1 | 1 | 1 | 1 | 1 | 1 | 1 |
| | | Total | 113.5 | 113.8 | 113.5 | 114.0 | 114.5 | 115.5 | 116.5 | 114.5 |
| Physical properties | | Expansion ratio | 5.3 | 3.2 | 6.8 | Measurement impossible | Measurement impossible | Measurement impossible | Measurement impossible | Measurement impossible |
| | | Specific gravity before foaming (specific gravity of composition) | 1.6 | 1.6 | 1.85 | Measurement impossible | Measurement impossible | Measurement impossible | Measurement impossible | Measurement impossible |
| | | Specific gravity after foaming (specific gravity of formed product) | 0.311 | 0.5 | 0.27 | Measurement impossible | Measurement impossible | Measurement impossible | Measurement impossible | Measurement impossible |
| | | Outer appearance | Good | Good | Good | Slightly poor | Void | Void | Void | Void |
| | | Tensile break strength (kg/cm$^2$) | 12.4 | 13.8 | 10.0 | Measurement impossible | Measurement impossible | Measurement impossible | Measurement impossible | Measurement impossible |
| | | Stretch at break (%) | 460 | 440 | 470 | Measurement impossible | Measurement impossible | Measurement impossible | Measurement impossible | Measurement impossible |
| | | Tear strength (kg/cm$^2$) | 3.1 | 3.9 | 2.4 | Measurement impossible | Measurement impossible | Measurement impossible | Measurement impossible | Measurement impossible |
| | | Hardness (type-C) | 10 | 12 | 7 | Measurement impossible | Measurement impossible | Measurement impossible | Measurement impossible | Measurement impossible |

As shown in Table 1, in Comparative Examples 1 to 5 in which the crosslinking aid was added in an amount of at least 0.5 part by mass, no favorable foamed state was obtained. Whereas, in Examples 1 and 3 in which no crosslinking aid was contained and in Example 2 in which the amount of addition of the crosslinking aid was 0.3 part by mass, a uniform and favorable foamed state was obtained, and a fluorinated foamed rubber having favorable outer appearance and favorable physical properties was obtained.

from 0.001 to 0.3 part by mass of a crosslinking aid which is a compound having at least two carbon-carbon double bond-containing groups in the same molecule, provided that the carbon-carbon double bond-containing groups present in the same molecule may be the same or different, wherein the fluorinated elastomer is at least one member selected from the group consisting of a tetrafluoroethylene/propylene copolymer and a tetrafluoroethylene/propylene/vinylidene fluoride copolymer.

2. The fluorinated elastomer composition according to claim 1, wherein the crosslinking aid is triallyl cyanurate, triallyl isocyanurate or trimethallyl isocyanurate.

3. The fluorinated elastomer composition according to claim 1, wherein an amount of the crosslinking aid is less than 0.1 part by mass.

4. The fluorinated elastomer composition according to claim 1, wherein the blowing agent is an azo compound, a nitroso compound or a hydrazine compound.

5. A fluorinated foamed rubber, obtained by foaming and crosslinking the fluorinated elastomer composition as defined in claim 1.

6. The fluorinated foamed rubber according to claim 5, wherein the expansion ratio represented by the following formula is at least 5, and the tensile break strength is at least 8 kg/cm$^2$:

expansion ratio=[specific gravity of the fluorinated elastomer composition before foaming]/[specific gravity of the fluorinated foamed rubber].

7. A method for producing a fluorinated foamed rubber, comprising foaming and crosslinking the fluorinated elastomer composition as defined in claim 1.

8. The method according to claim 7, wherein the fluorinated elastomer composition is heated to from 100 to 300° C. to be foamed and crosslinked.

9. The method according to claim 7, wherein the fluorinated elastomer composition is heated to a first temperature of from 100 to 250° C., and then heated to a second temperature of from 150 to 300° C., the second temperature being higher than the first temperature.

10. The fluorinated elastomer composition according to claim 1, wherein an amount of the blowing agent is from 0.3 to 15 parts by mass.

11. The fluorinated elastomer composition according to claim 1, wherein an amount of the blowing agent is from 0.5 to 10 parts by mass.

12. The fluorinated elastomer composition according to claim 1, wherein an amount of the crosslinking agent is from 0.3 to 5 parts by mass.

13. The fluorinated elastomer composition according to claim 1, wherein an amount of the crosslinking agent is from 0.5 to 3 parts by mass.

14. The fluorinated elastomer composition according to claim 1, wherein an amount of crosslinking aid is 0.005 part by mass or more.

15. The fluorinated elastomer composition according to claim 1, wherein an amount crosslinking aid is 0.01 part by mass or more.

* * * * *